United States Patent [19]

Emeott et al.

[11] Patent Number: 5,721,732

[45] Date of Patent: Feb. 24, 1998

[54] METHOD OF TRANSMITTING USER INFORMATION AND OVERHEAD DATA IN A COMMUNICATION DEVICE HAVING MULTIPLE TRANSMISSION MODES

[75] Inventors: Stephen P. Emeott; Timothy J. Wilson, both of Schaumburg, Ill.

[73] Assignee: Motorola, Inc., Schaumburg, Ill.

[21] Appl. No.: 551,113

[22] Filed: Oct. 31, 1995

[51] Int. Cl.$^6$ .................................................. H04J 3/12
[52] U.S. Cl. ........................... 370/437; 370/523; 370/528
[58] Field of Search ..................................... 370/345, 348, 370/349, 329, 336, 337, 442, 458, 468, 470, 471, 472, 473, 474, 522, 528, 437, 523; 455/517

[56] References Cited

U.S. PATENT DOCUMENTS

| | | | |
|---|---|---|---|
| 4,730,312 | 3/1988 | Johnson et al. | 370/523 |
| 5,481,537 | 1/1996 | Criler et al. | 370/437 |
| 5,644,576 | 7/1997 | Bauchot et al. | 370/437 |

*Primary Examiner*—Wellington Chin
*Assistant Examiner*—Steven Nguyen
*Attorney, Agent, or Firm*—Daniel C. Crilly

[57] ABSTRACT

A communication device (e.g., 106) having multiple transmission modes employs a method of transmitting user information (309, 310) and intermittent overhead data (307, 308). The communication device (106) selects from a first transmission technique and a second transmission technique. When the first transmission technique is selected and overhead data (307) is to be transmitted, the communication device (106) replaces a first predetermined amount of the user information (309) with the overhead data (307) to form a data unit. When the second transmission technique is selected and overhead data (308) is to be transmitted, the communication device (106) replaces a second predetermined amount of the user information (310) with the overhead data (308) to form the data unit, wherein the second predetermined amount is less than the first predetermined amount. The communication device (106) then transmits the data unit formed by either transmission technique, such that when using the second transmission technique, an increased number of bits (506) are available over time to represent the user information, while a substantially equal number of bits (508) are available over time to represent the overhead data as compared to the first transmission technique.

16 Claims, 5 Drawing Sheets

METHOD OF TRANSMITTING USER INFORMATION AND OVERHEAD DATA IN A COMMUNICATION DEVICE HAVING MULTIPLE TRANSMISSION MODES

FIELD OF THE INVENTION

The present invention relates generally to communication devices and, in particular, to a method of transmitting user information and overhead data in a communication device having multiple transmission modes.

BACKGROUND OF THE INVENTION

Communication systems are known to include a controller, a plurality of base sites, and a plurality of communication units, such as mobile or portable two-way radios. Such communication systems allow information to be conveyed between two or more communication devices (e.g., between a communication unit and a base site). One such communication system is a time division multiplexed (TDM) communication system. In a TDM system, one communication device typically transmits user information, such as voice or data, to another communication device via an assigned communication channel consisting of time slots of a radio frequency carrier. The time slots are generally assigned to the communication device by the controller in a repetitious manner known as an interleaving rate. A typical interleaving rate is 6-to-1. That is, the communication device assigned to a TDM channel transmits its respective data once every six time slots.

Each time slot typically includes user information, an associated control procedure (ACP) flag, supplemental control information, such as a base site or communication unit identification and a time synchronization signal, and, on occasion, ACP information. The ACP information typically comprises handoff information or short messages, such as pages. The ACP flag is used to inform the receiving communication device of the presence or absence of ACP information. When the ACP flag is set, the time slot contains ACP information; whereas, when the ACP flag is reset, the time slot does not contain ACP information.

Each time slot utilized in a 6-to-1 interleave pattern typically allocates 664 bits to support the transmission of user information. Generally, the user information is encoded (e.g., using a voice encoder or vocoder) and error-corrected prior to being inserted in the time slot. Thus, the 664 bits per time slot contain encoded and error-corrected user information. When ACP information also needs to be transmitted, the communication device typically replaces 164 bits of the encoded and error-corrected user information with some or all of the ACP information. That is, the communication device writes 166 bits of ACP information over 166 bits of encoded and error-corrected user information. Although this overwriting technique effectively deletes 166 bits of the encoded and error-corrected user information, the error correction utilized is typically robust enough to permit recovery of the user information at the receiving communication device without substantial degradation to the user information, provided errors introduced by the communication channel are insubstantial. However, where more substantial errors are introduced by the communication channel, such as errors introduced by multi-path fading, adjacent channel interference, co-channel interference, and environmental noise, recovery of the user information at the receiving device is less likely.

Therefore, a need exists for a method of transmitting user information and ACP information that permits reliable recovery of the user information in the presence of substantial channel errors, while maintaining the existing rate of transmission of ACP information (i.e., 166 bits every six time slots). Such a method applied in a communication device having multiple transmission modes (e.g., being capable of transmitting at multiple interleave rates) would be an improvement over the prior art.

DESCRIPTION OF A PREFERRED EMBODIMENT

Generally, the present invention provides a method of transmitting user information and overhead data in a communication device having multiple transmission modes. The communication device, which provides user information (e.g., voice or data) and, on occasion, overhead data, selects from a first transmission technique and a second transmission technique. When the first transmission technique is selected, the communication device utilizes a first encoding technique to encode a representation of the user information. When overhead data is to be transmitted, the communication device replaces a first predetermined amount of the representation of the user information with the overhead data to form a data unit. Similarly, when the second transmission technique is selected, the communication device utilizes a second encoding technique to encode a representation of the user information. However, in this case, when overhead data is to be transmitted, the communication device replaces a second predetermined amount of the representation of the user information with the overhead data to form the data unit, wherein the second predetermined amount is less per data unit than the first predetermined amount. The communication device then transmits the data unit formed by either transmission technique, such that when using the second transmission technique, an increased number of bits are available over time to represent the user information, while a substantially equal number of bits are available over time to represent the overhead data as compared to the first transmission technique. By transmitting the user information and overhead data in this manner, the present invention permits users of 3-to-1 time slot interleave rates to more than double their user information throughput over time as compared to users of 6-to-1 time slot interleave rates, while maintaining overhead data transmission over time that is comparable to users of 6-to-1 time slot interleave rates.

Figure 1:
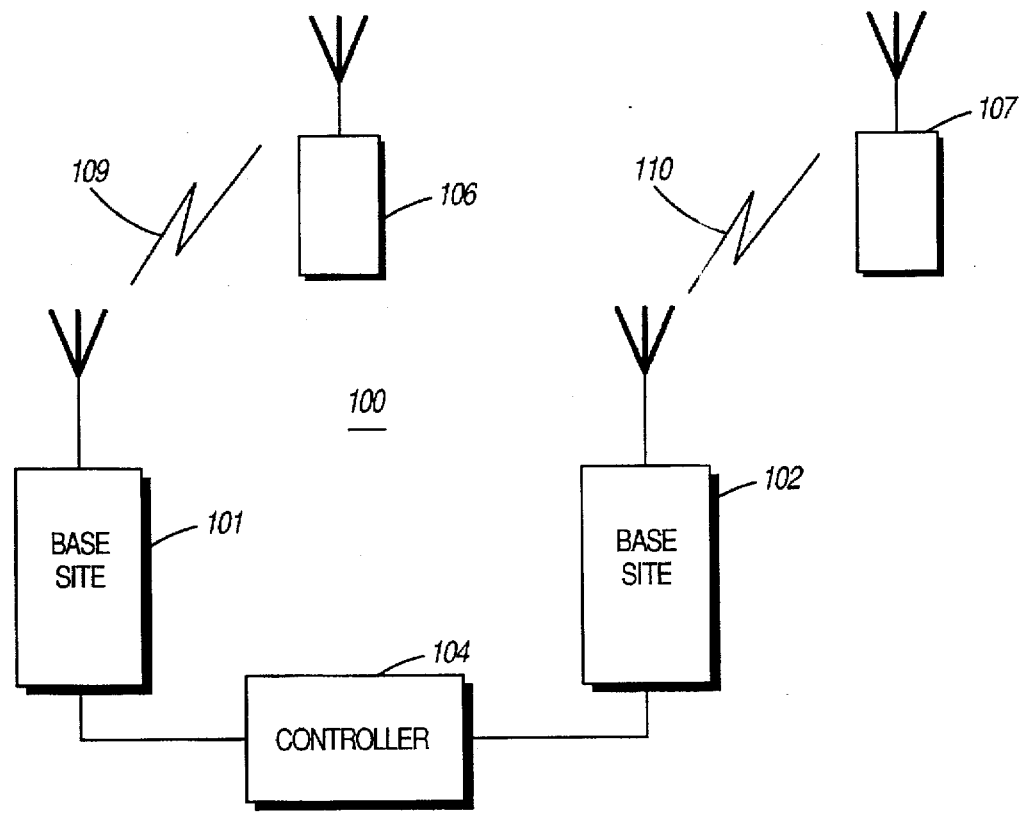
FIG. 1 illustrates a block diagram depiction of a radio communication system that may beneficially employ the present invention.

The present invention can be more fully described with reference to FIGS. 1–7. FIG. 1 illustrates a block diagram depiction of a radio communication system 100 that may beneficially employ the present invention. The radio communication system 100 includes a plurality of base sites 101, 102 (two shown), a controller 104, and a plurality of communication units 106, 107 (two shown). In a preferred embodiment, the radio communication system 100 comprises a time division multiplexer (TDM) system, such as the "iDEN" digital trunking system manufactured by Motorola, Inc. Accordingly, the base sites 101, 102 preferably comprise "iDEN" base stations and the controller preferably comprises an "iDEN" central controller. Each communication unit 106, 107 preferably comprises any mobile radio, portable radio, radiotelephone, two-way pager, or wireless data terminal that is operable in an "iDEN" trunking system. For the purposes of the present invention, the base sites 101, 102 and the communication units 106, 107 can generally be referred to as communication devices. Furthermore, the present invention is most readily implemented as a software algorithm in the communication devices 101, 102, 106, 107.

Each communication device 101, 102, 106, 107 transmits information to another communication device 101, 102, 106, 107 via a communication resource, or channel 109, 110. In the preferred embodiment, the communication channels 109, 110 comprise one or more communication time slots assigned to a particular communication device 101, 102, 106, 107. The time slots are preferably conveyed between communication devices 101, 102, 106, 107 via radio frequency carriers. The quantity of time slots depends on the amount of information to be transmitted, while the timing of the time slot transmissions depends on the assigned time slot's interleave rate (i.e., the periodic rate at which information is transmitted—e.g., every sixth time slot or every third time slot).

Operation of the radio communication system 100 occurs substantially as follows in accordance with a preferred embodiment of the present invention. When a communication device (e.g., 106) desires to transmit information to another communication device (e.g., 107), the communication device 106 transmits a channel request to the controller 104 over a dedicated control channel, as is well-known in the art. The controller 104 then assigns the requesting communication device 106 a transmission channel over which to transmit information. The transmission channel grant preferably comprises a time slot identifier, an interleave rate, and a radio frequency carrier. In the preferred embodiment, the radio communication system 100 supports two interleave rates: 6-to-1 (i.e., transmit every sixth time slot) and 3-to-1 (i.e., transmit every third time slot).

Upon receiving the channel assignment, a user of the requesting communication device 106 provides information, such as voice (e.g., via a microphone), to the communication device 106 for transmission. The communication device 106 then selects between the 6-to-1 transmission technique and the 3-to-1 transmission technique depending on the interleave rate specified in the transmission channel grant. When the communication device 106 selects the 6-to-1 transmission technique, the communication device 106 encodes the user's voice using a first vocoding technique, such as vector sum excited linear predictive (VSELP) encoding at 4.2 kilobits per second (kbps), to produce digital representations of the user's voice. The digital representations are then error corrected—e.g., using a forward error control technique adapted to the 4.2 kbps VSELP—to produce digital representations that are less sensitive to channel-induced errors, such as those due to multi-path fading, adjacent channel interference, co-channel interference, and environmental noise.

Upon producing the error-corrected representations, the communication device determines whether overhead data, such as associated control procedure (ACP) information, must accompany the voice during transmission. From a communication unit's perspective, ACP information includes, inter alia, mobile assisted handoff (MAHO) information or dialed digits; whereas, from a base site's perspective, ACP information includes, inter alia, handoff information and short messages (e.g., pages). For example, when the user is talking and the communication device 106 determines that a handoff from one base site (e.g., 101) to another base site (e.g., 102) is necessary, the communication device 106 might decide to transmit a list of handoff target base sites to the serving base site (e.g., 101) together with the digitized, error-corrected voice. This list of target sites would constitute overhead data. The overhead data is transmitted intermittently and, in general, does not affect transmission in every assigned time slot.

When overhead data is to be transmitted, the communication device 106 replaces a predetermined amount of bits normally used for error-corrected voice with the overhead data (or at least some of the overhead data depending on the number of bits required to convey such data). The apportionment of user information (e.g., error-corrected voice) and overhead data in each time slot used to transmit overhead data using the 6-to-1 transmission technique is known and described below with regard to FIG. 2. The overhead data, when transmitted, typically occupies one-fourth of the bits generally used to convey error-corrected voice. When overhead data does not need to be transmitted, the communication device 106 simply transmits the error-corrected voice in each assigned time slot (i.e., every sixth time slot) until the communication is terminated.

When the communication device 106 selects the 3-to-1 transmission technique, the communication device 106 encodes the user's voice using a second vocoding technique, such as 8 kbps VSELP, to produce digital representations of the user's voice. Thus, when using the 3-to-1 technique, the communication device 106 digitally encodes the voice at approximately twice the rate of the 6-to-1 technique. The digital representations are then error corrected—e.g., using a forward error control technique adapted to the 8 kbps VSELP—to produce digital representations that are less sensitive to channel-induced errors.

Upon producing the error-corrected representations, the communication device 106 determines whether intermittent overhead data must accompany the voice during transmission. When overhead data does not need to be transmitted, the communication device 106 simply transmits the error-corrected voice in each assigned time slot (i.e., every third time slot) until the communication is terminated. When overhead data is to be transmitted, the communication device 106 replaces a predetermined amount of bits normally used for error-corrected voice with at least some of the overhead data. The apportionment of user information (e.g., error-corrected voice) and overhead data in each time slot used to transmit overhead data using the 3-to-1 transmission technique is described in more detail below with regard to FIG. 3. In this case, the overhead data occupies approximately one-eighth of the bits generally used to convey error-corrected voice. Thus, when the 3-to-1 transmission technique is utilized, the present invention provides an increased number of bits per time slot for transmission of the error-corrected voice as compared to using the 6-to-1 technique, while maintaining a substantially equal number of bits per unit time (e.g., every second) as compared with the 6-to-1 technique to transmit overhead data. By transmitting less overhead data per slot in the 3-to-1 technique, the present invention provides for a higher probability of detection of the transmitted user information in high bit error environments since less bits per slot of user information are replaced by overhead data.

For example, assuming each time slot normally includes 664 bits per slot for transmitting user information, 166 bits per slot are typically utilized for conveying overhead data when using the 6-to-1 transmission technique; whereas, the present invention provides 84 bits per slot for conveying overhead data when using the 3-to-1 transmission technique. Thus, the present invention provides more bits per slot (580 bits per slot as compared with 498 bits per slot for the 6-to-1 technique) for error-corrected voice when using the 3-to-1 transmission technique than does the existing 6-to-1 technique. However, on a per unit time basis (e.g., every second—corresponding to about six slots), both techniques provide substantially the same number of bits (166 bits for the 6-to-1 technique compared to 168 bits for the 3-to-1 technique) for conveying overhead data, while the present invention allows the 3-to-1 transmission technique to utilize more than twice the number of bits (1160 compared to 498) for transmitting user information as does the existing 6-to-1 technique. By providing more bits for transmitting user information in the 3-to-1 technique, the present invention not only allows more information to be transmitted, it also allows more robust error correction to be used to improve received signal quality. This example is examined in more detail below with regard to FIGS. 2–5.

Figure 2:
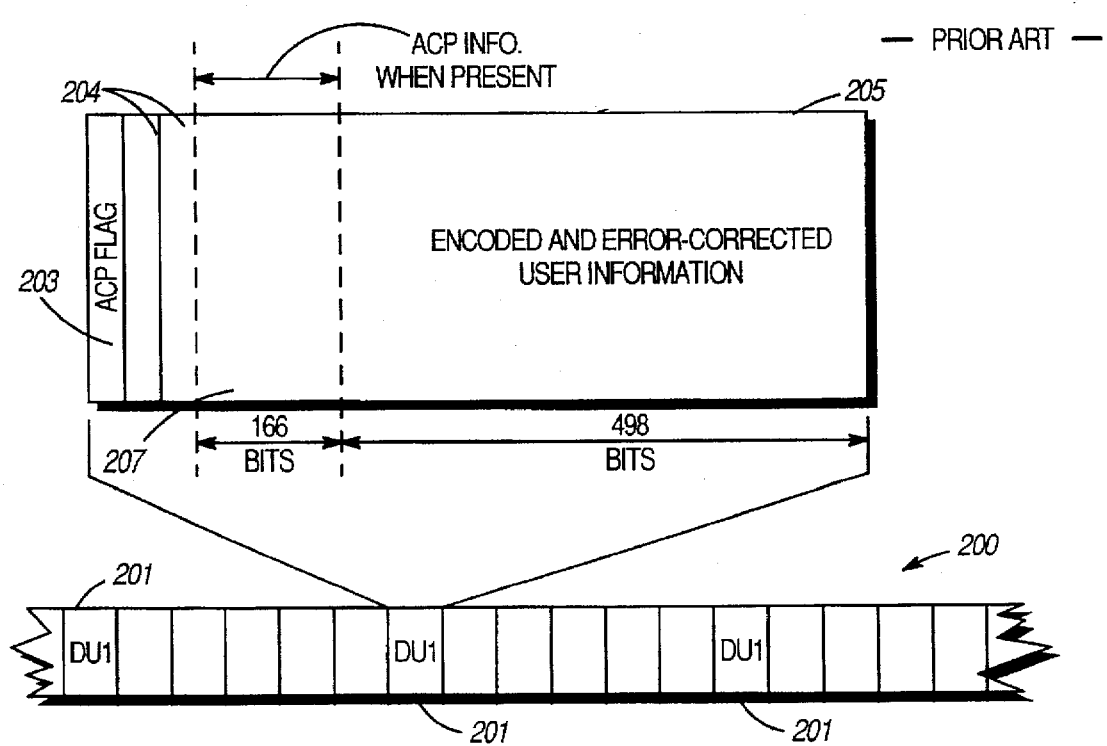
FIG. 2 illustrates a typical transmission time slot having a 6-to-1 interleave rate.

FIG. 2 illustrates a typical channel 200 for transmitting time slots 201 having a 6-to-1 interleave rate (i.e., transmission occurs every sixth time slot). As shown, each time slot includes an ACP flag 203, supplemental control data 204—such as a base site or communication unit identification and a time synchronization signal—and encoded and error-corrected user information (voice or data) 205. In addition, when overhead data 207 (e.g., ACP information) is to be transmitted, each time slot conveying the overhead data 207 includes at least some of the overhead data 207. When overhead data 207 is present, the overhead data 207 actually replaces a predetermined amount of the error-corrected user information 205. Thus, as shown in FIG. 2, when overhead data 207 is present, the overhead data 207 replaces one-fourth, or 166 bits, of the 664 bits of error-corrected user information, thereby leaving three-fourths, or 498 bits, of the error-corrected user information in each slot, or data unit (DU1), used to convey the overhead data 207. Consequently, the error-correction selected to encode the user information needs to be robust enough to overcome this loss of error-corrected user information.

The ACP flag 203 informs the receiving device of the presence, or lack thereof, of overhead data in the data unit consisting of the overhead data 207, when transmitted, and the user information 205. When the transmitting communication device is transmitting overhead data 207, the device sets the ACP flag 203—e.g., to a logical 1. Likewise, when overhead data 207 is not being transmitted, the transmitting device resets the ACP flag 203—e.g., to a logical 0. By examining the ACP flag 203, the receiving communication device can quickly determine whether it must utilize protocol layers associated with ACP to receive and process the ACP overhead.

Figure 3:
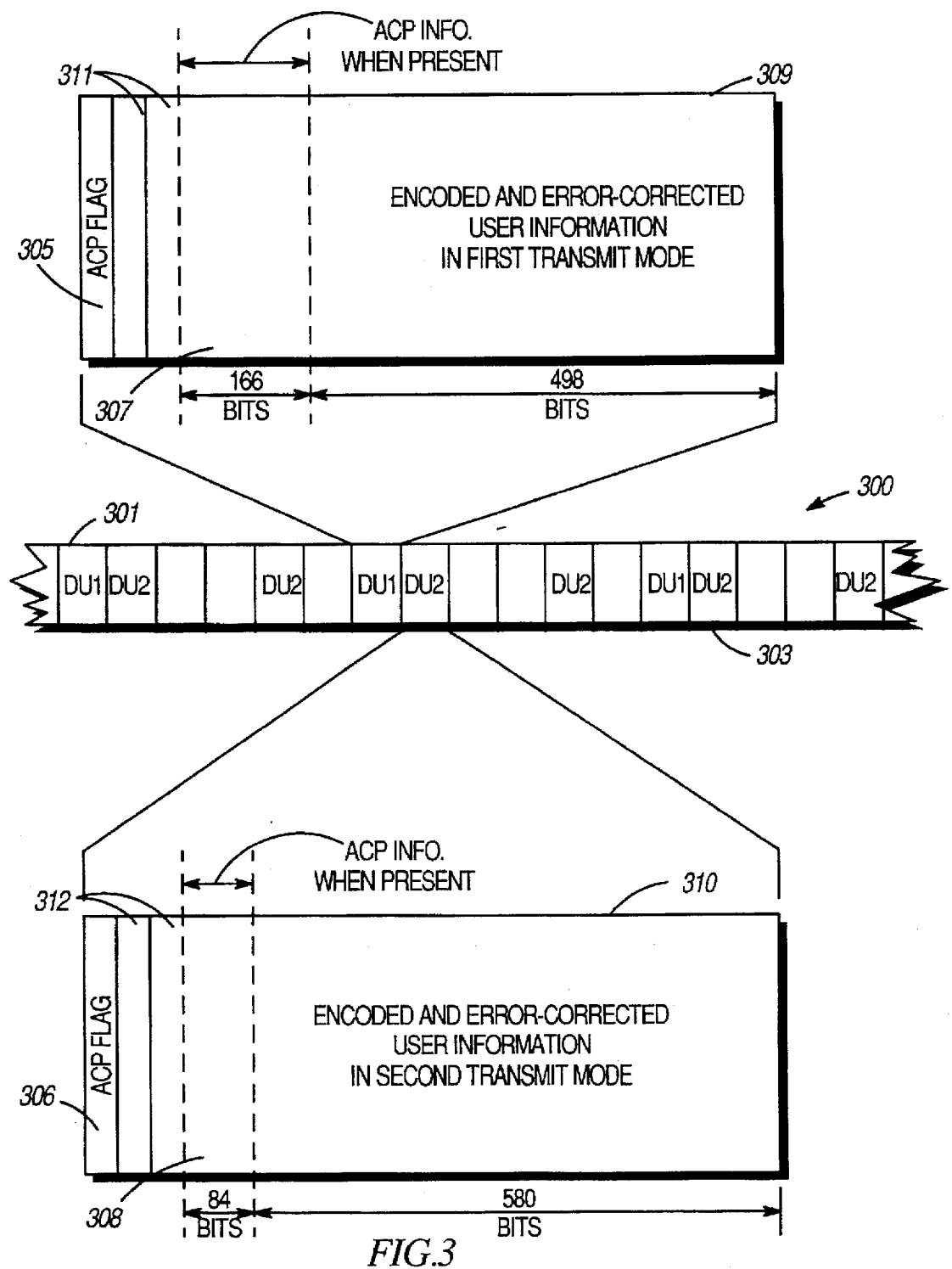
FIG. 3 illustrates a transmission time slot having a first interleave rate pursuant to a first transmission technique and a transmission time slot having a second interleave rate pursuant to a second transmission technique in accordance with the present invention.

FIG. 3 illustrates a transmission time slot 301 having a first interleave rate pursuant to a first transmission technique and a transmission time slot 303 having a second interleave rate pursuant to a second transmission technique in accordance with the present invention. As shown, the first interleave rate preferably comprises a 6-to-1 interleave rate and the second interleave rate preferably comprises a 3-to-1 interleave rate. Each time slot 301, or data unit (DU1), associated with the first (6-to-1) mode of transmission includes an ACP flag 305, supplemental control data 311, encoded and error-corrected user information 309 and, on occasion, overhead data 307 (e.g., ACP information). Each time slot 303, or data unit (DU2), associated with the second (3-to-1) mode of transmission similarly includes an ACP flag 306, supplemental control data 312, encoded and error-corrected user information 310 and, on occasion, overhead data 308.

The interleaved time slots of each transmission technique constitute a transmission channel 300 for the respective transmission technique. Thus, the time slots 301 designated DU1 constitute a transmission channel for the first transmission mode; whereas, the time slots 303 designated DU2 constitute a transmission channel for the second transmission mode.

In the preferred first mode of transmission, when overhead data 307 is not present, the ACP flag 305 is reset and the error-corrected user information 309 occupies a portion of the time slot 301 consisting of all the bits (664 bits in the preferred embodiment) available for transmission of user information. However, when overhead data 307 is present, the ACP flag 305 is set and the overhead data 307 replaces approximately one-fourth (166 bits in the 6-to-1 case) of the bits available for transmission of user information. Therefore, when overhead data 307 is present, the error-corrected user information 309 resides in a first portion of each time slot 301 and the overhead data 307 resides in a second portion of each time slot 301.

In the preferred second mode of transmission, when overhead data 308 is not present, the ACP flag 306 is reset and the error-corrected user information 310 occupies a portion of the time slot 303 consisting of all the bits (664 bits in the preferred embodiment) available for transmission of user information. However, when overhead data 308 is present, the ACP flag 306 is set and the overhead data 308 replaces approximately one-eighth (84 bits in the 3-to-1 case) of the bits available for transmission of user information. Therefore, as in the first transmission mode, when overhead data 308 is present, the error-corrected user information 310 resides in a first portion of each time slot 303 and the overhead data 308 resides in a second portion of each time slot 303.

In contrast to the first transmission mode, the second transmission mode utilizes approximately one-half the bits utilized by the first mode to transmit overhead data 308. Thus, on a per slot basis, each time slot 303 used in the 3-to-1 transmission technique has more bits available for transmitting error-corrected user information 310 than does each time slot 301 used in the 6-to-1 transmission technique. However, since the 3-to-1 time slots 303 are transmitted twice as often as the 6-to-1 time slots 301, both transmission techniques convey substantially equal overhead data per unit time (e.g., per second), while the 3-to-1 technique conveys more than twice the amount of error-corrected user information as the 6-to-1 technique. Thus, as described above with regard to FIG. 1, during each six time slot transmission time frame, the 3-to-1 transmission mode conveys 168 bits of overhead data, when present, and 1160 bits of error-corrected user information, while the 6-to-1 transmission technique conveys 166 bits of overhead data and 498 bits of error-corrected user information. This result is depicted more clearly on a per slot basis in FIG. 4 and on a per unit time basis in FIG. 5.

Figure 4:
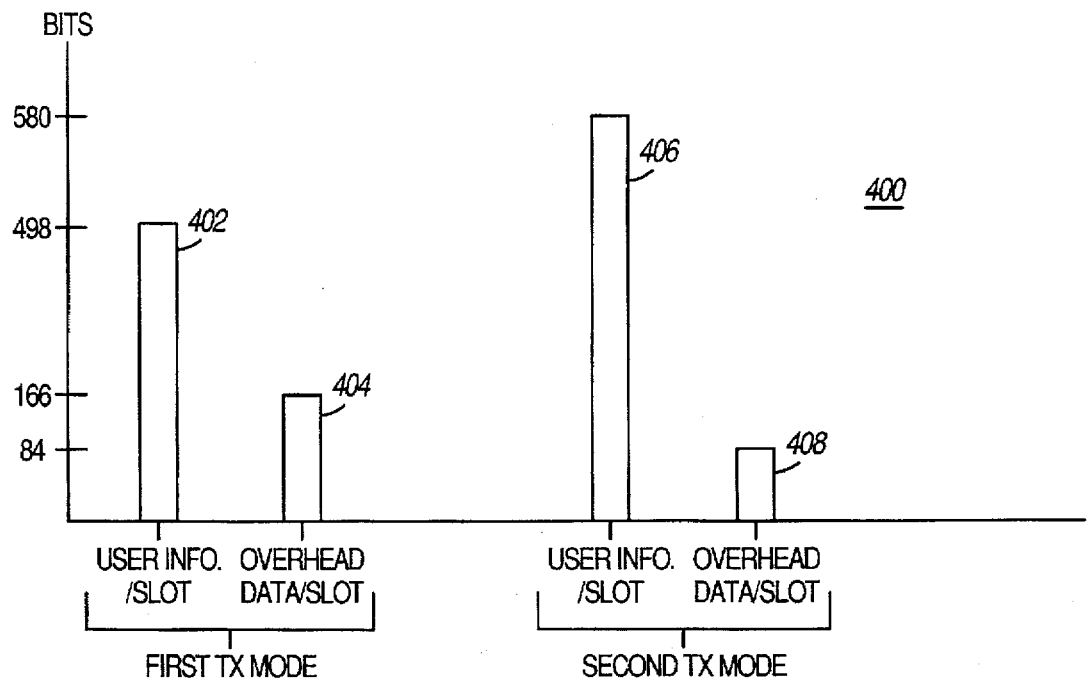
FIG. 4 illustrates a graphical representation of the apportionment of bits per time slot to user information and overhead data in each transmission mode in accordance with a preferred embodiment of the present invention.

FIG. 4 illustrates a graphical representation 400 of the apportionment of bits per time slot to user information and overhead data in each transmission mode in accordance with a preferred embodiment of the present invention. The first transmission mode using the 6-to-1 transmission technique provides 498 bits per slot of user information (vertical bar 402) and 166 bits per slot of overhead data (vertical bar 404). By contrast, the second transmission mode using the 3-to-1 transmission technique provides 580 bits per slot of user information (vertical bar 406) and 84 bits per slot of overhead data (vertical bar 408). Thus, each time slot using the 3-to-1 transmission technique provides an increased number of bits for transmitting user information and correspondingly less bits for transmitting overhead data as compared with each time slot using the 6-to-1 transmission technique.

Figure 5:
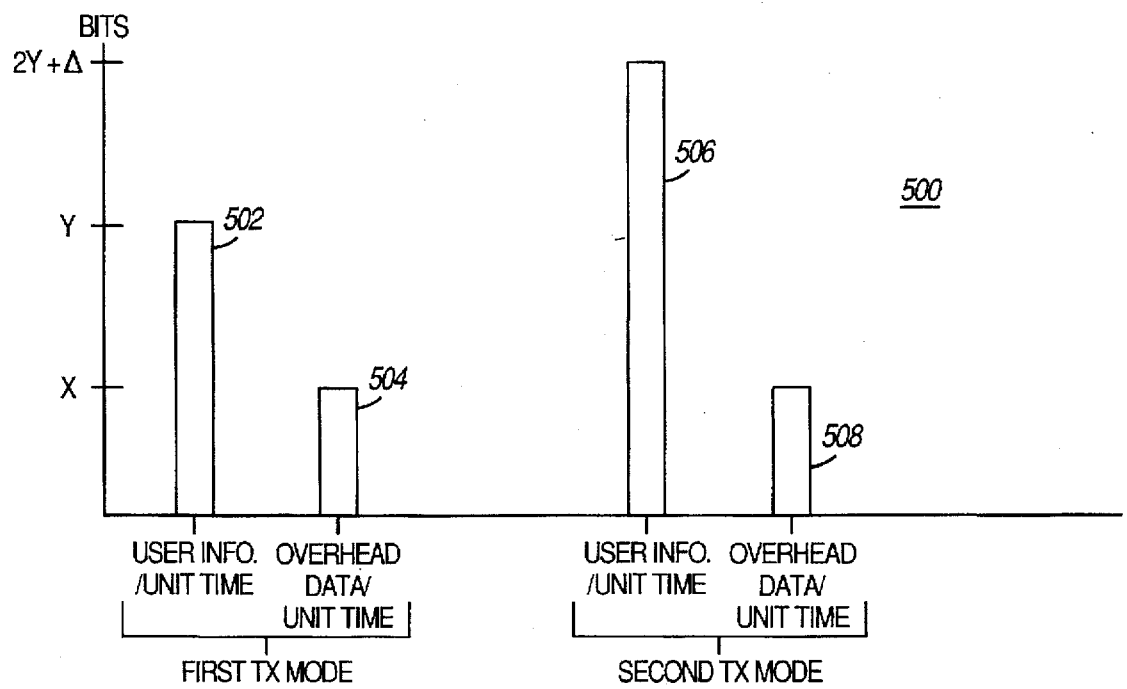
FIG. 5 illustrates a graphical representation of the apportionment of bits per unit time to user information and overhead data in each transmission mode in accordance with a preferred embodiment of the present invention.

FIG. 5 illustrates a graphical representation 500 of the apportionment of bits per unit time to user information and overhead data in each transmission mode in accordance with a preferred embodiment of the present invention. As shown, the amount (Y) of user information transmitted per unit time in the first transmission mode (vertical bar 502) is less than half the amount (2Y+Δ) of user information transmitted per unit time in the second transmission mode (vertical bar 506). However, both transmission modes transmit approximately equal overhead data over time (vertical bars 504 and 508). Using the bit quantities carried through the discussions of FIGS. 1–4 above and assuming one unit of time is equivalent to the length of time of six time slots, the 3-to-1 transmission technique provides 1160 bits of user information per unit time; whereas, the 6-to-1 transmission technique provides only 498 bits of user information per unit time, while both techniques provide approximately 167 bits (168 bits and 166 bits, respectively) of overhead data per unit time. Thus, with the present invention, the 3-to-1 transmission technique provides 662 (approximately 133%) more bits per unit time for transmitting user information than the 6-to-1 transmission technique.

Therefore, by reducing the amount of bits allocated to overhead data in each time slot using the 3-to-1 technique, the present invention not only provides more bits, both per slot and over time, for transmitting user information than existing single mode 6-to-1 techniques, it also provides more bits, both per slot and over time, for transmitting user information than if existing 6-to-1 time slots—using 166 bits for overhead and 498 bits for user information—were simply transmitted at twice the rate (i.e., to effectuate a 3-to-1 interleave rate). If an existing 6-to-1 time slot were transmitted at a 3-to-1 rate, only 996 bits per second would be available for transmitting user information as compared to 1160 bits per second with the present invention. Thus, the present invention allows more user information to be transmitted per unit time without degrading overhead data transmission per unit time, as compared with existing single mode 6-to-1 transmission systems.

Figure 6:
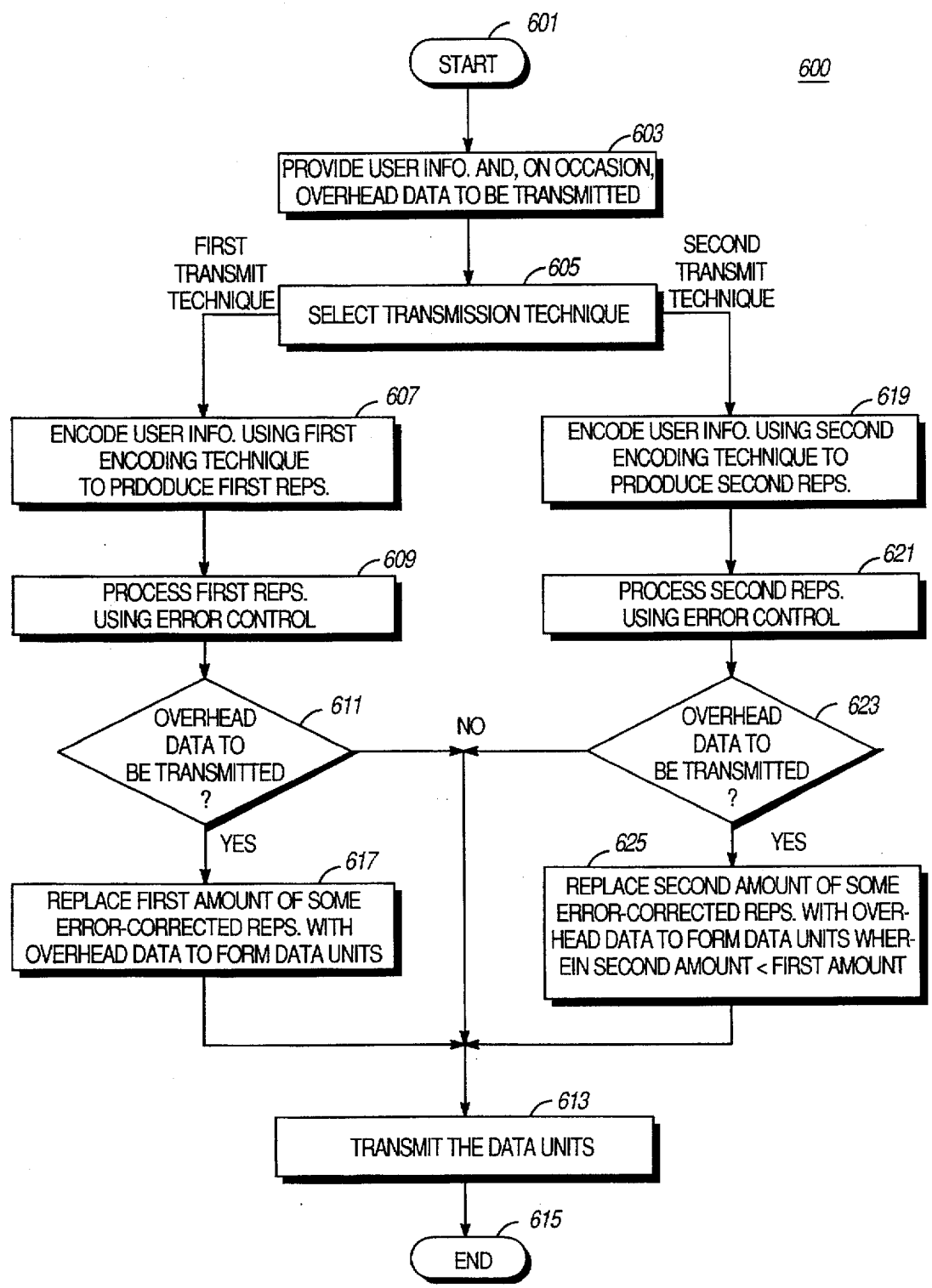
FIG. 6 illustrates a logic flow diagram of steps executed by a communication device to transmit user information and, on occasion, overhead data in accordance with a preferred embodiment of the present invention.

FIG. 6 illustrates a logic flow diagram 600 of steps executed by a communication device to transmit user information and overhead data in accordance with a preferred embodiment of the present invention. The logic flow begins (601) when the communication device provides (603) user information and, on occasion, overhead data to be transmitted. The communication device then selects (605) the appropriate radio frequency transmission technique. In a preferred embodiment, this selection corresponds to the particular channel assigned to the communication device. Thus, if the communication device is assigned to a channel having a 6-to-1 interleave rate, the communication device selects the first transmission technique. Similarly, if the communication device is assigned to a channel having a 3-to-1 interleave rate, the communication device selects the second transmission technique.

When the communication device selects (605) the first transmission technique (e.g., the 6-to-1 technique), the communication device encodes (607) the user information using a first encoding technique to produce a plurality of first representations of the user information. In the preferred embodiment, the communication device vocodes the communication device user's voice information using 4.2 kbps VSELP to produce digital representations of the voice information.

Upon encoding the user information, the communication device processes (609) the encoded representations of the user information using an error control technique to produce error control processed representations of the user information. In the preferred embodiment, the communication device uses a forward error correction technique specifically adapted for 4.2 kbps VSELP to error-correct the encoded representations and, thereby, produce the error control processed representations. In the preferred embodiment, the forward error correction technique comprises the 6-to-1 "iDEN" forward error correction technique described in Chapter 8 of the publication entitled "iDEN RF Interface Layer 2," which is available from Motorola, Inc. as Motorola part number 68P81127E89, and which is incorporated herein by reference.

The communication device then determines (611) whether overhead data is to be transmitted. When overhead data is not to be transmitted, the communication device forms each error control processed representation into a data unit (e.g., as 664 bits in a TDM time slot) and transmits (613) each data unit to a receiving communication device in accordance with the first transmission technique, thereby ending (615) the logic flow. When overhead data is to be transmitted, the communication device replaces (617) a first amount of some of the error control processed representations with the overhead data, or portions thereof, to produce the data units. In the preferred embodiment, the communication device replaces 166 bits of some of the 664-bit error control processed representations with overhead data to form the data units. For example, if 664 bits of overhead data needed to be transmitted, the communication device would replace 166 bits of four 664-bit error control processed representations (e.g., the first four contiguous 664-bit error control processed representations) to produce the four data units needed to convey the overhead data. Any remaining user information would then be conveyed in subsequent data units as 664-bit error control processed representations. Upon forming the data units, the communication unit transmits (613) the data units at the interleave rate of the first transmission technique and the logic flow ends (615).

When the communication device selects (605) the second transmission technique (e.g., the 3-to-1 technique), the communication device encodes (619) the user information using a second encoding technique to produce a plurality of second representations of the user information. In the preferred embodiment, the communication device vocodes the communication device user's voice information using 8 kbps VSELP to produce digital representations of the voice information.

Upon encoding the user information, the communication device processes (621) the encoded representations of the user information using an error control technique to produce error control processed representations of the user information. In the preferred embodiment, the communication device uses a forward error correction technique specifically adapted for 8 kbps VSELP to error-correct the encoded representations and, thereby, produce the error control processed representations. In the preferred embodiment, the forward error correction technique comprises the technique described in co-pending U.S. Patent application entitled "A Method Of Transmitting Error Correction Information," having attorney docket number CM01087G, being filed on an even date herewith, being assigned to the assignee of the present invention, and being incorporated herein by reference.

The communication device then determines (623) whether overhead data is to be transmitted. When overhead data is not to be transmitted, the communication device forms each error control processed representation into a data unit (e.g., as 664 bits in a TDM time slot) and transmits (613) each data unit to a receiving communication device in accordance with the second transmission technique, thereby ending (615) the logic flow. When overhead data is to be transmitted, the communication device replaces (625) a second amount of some of the error control processed representations with the overhead data, or portions thereof, to form the data units, wherein the second amount is less than the first amount used to replace some of the error control processed representations with overhead data using the first transmission technique. In the preferred embodiment, the communication device replaces 84 bits of some of the 664-bit error control processed representations with overhead data to produce the data units. For example, if 672 bits of overhead data needed to be transmitted, the communication device would replace 84 bits of eight 664-bit error control processed representations (e.g., the first eight contiguous 664-bit error control processed representations) to produce the eight data units needed to convey the overhead data. Any remaining user information would then be conveyed in subsequent data units as 664-bit error control processed representations. Upon forming the data units, the communication unit transmits (613) the data units at the interleave rate of the second transmission technique and the logic flow ends (615). It should be noted that since the rate of transmission of the second technique is twice as frequent as the rate of transmission of the first technique, the user information is conveyed more quickly with the second technique than with the first technique; whereas, the overhead information is conveyed at approximately the same rate with both techniques.

Figure 7:
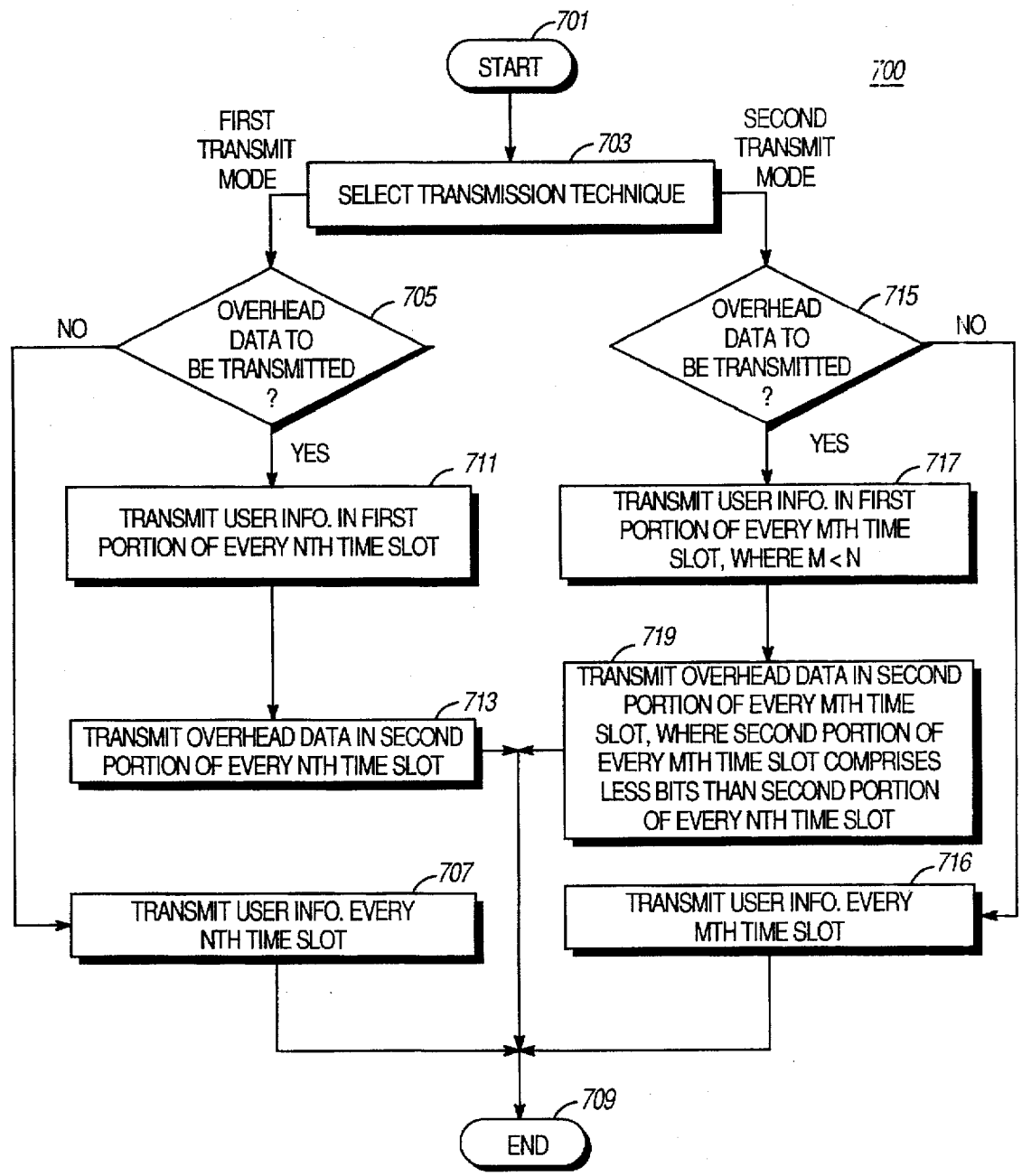
FIG. 7 illustrates an alternative logic flow diagram of steps executed by a communication device to transmit user information and, on occasion, overhead data in accordance with the present invention.

FIG. 7 illustrates an alternative logic flow diagram 700 of steps executed by a communication device to transmit user information and overhead data in accordance with the present invention. The logic flow begins (701) when the communication device selects (703) a transmission mode. The selection is preferably in response to the allocation of a channel that supports a particular transmission mode (e.g., N-to-1 or M-to-1). Regardless of which transmission mode is selected, the communication device determines (705, 715) whether overhead data is to be transmitted in addition to the user information. When the first transmission mode is selected and overhead data is not to be transmitted, the communication device transmits (707) the user information in every Nth time slot (i.e., using an interleaving rate of N) until the user information has been completely transmitted and the logic flow ends (709).

However, when the first transmission mode is selected and overhead data is to be transmitted, the communication device transmits (711, 713) the user information in a first portion of every Nth time slot and the overhead data in a second portion of every Nth time slot until the overhead data has been transmitted. In a preferred embodiment, the overhead data actually replaces 166 bits of the 664 bits of user information and, therefore, represents a sub-portion of the user information portion of every Nth (e.g., sixth) time slot. In an alternate embodiment, the overhead data might occupy a portion of every Nth time slot without replacing the user information. In this embodiment, the communication device would insert, for example, 166 bits less of user information (e.g., only 498 bits if 664 bits were available to form a data unit) into every Nth time slot used to convey overhead data, as opposed to inserting 664 bits of user information and replacing 166 bits of the 664 bits of user information with overhead data. Once the overhead data has been transmitted, the communication device continues, if necessary, to transmit the user information in every Nth time slot and the logic flow ends (709).

When the second transmission mode is selected and overhead data is not to be transmitted, the communication device transmits (716) the user information in every Mth time slot (i.e., using an interleaving rate of M) until the user information has been completely transmitted and the logic flow ends (709). In a preferred embodiment, the second transmission mode provides more frequent transmission than the first transmission mode; thus, M is less than N.

When the second transmission mode is selected and overhead data is to be transmitted, the communication device transmits (717, 719) the user information in a first portion of every Mth time slot and the overhead data in a second portion of every Mth time slot until the overhead data has been transmitted, wherein the second portion of every Mth time slot comprises less bits than the second portion of every Nth time slot used in the first transmission mode. In a preferred embodiment, the overhead data replaces 84 bits of the 664 bits of user information and, therefore, represents a sub-portion of the user information portion of every Mth (e.g., third) time slot. The 84 bits used to represent the overhead data in the second transmission mode is slightly more than half the 166 bits used to represent the overhead data in the first transmission mode.

In an alternate embodiment, the overhead data might occupy a portion of every Mth time slot without replacing the user information. In this embodiment, the communication device would insert, for example, 84 bits less of user information (e.g., only 580 bits if 664 bits were available to form a data unit) into every Mth time slot used to convey overhead data, as opposed to inserting 664 bits of user information and replacing 84 bits of the 664 bits of user information with overhead data. Once the overhead data has been transmitted, the communication device continues, if necessary, to transmit the user information in every Mth time slot and the logic flow ends (709).

The present invention provides a method of transmitting user information and overhead data in a communication device having multiple transmission modes. With this invention, communication devices can advantageously utilize higher rate interleaving (e.g., 3-to-1) to reduce the audio delay associated with lower rate interleaving (e.g., 6-to-1), while maintaining overhead data throughput per unit time and increasing user information throughput per unit time as compared with existing 6-to-1 interleaving platforms. In addition, by transmitting less overhead data per slot at the higher interleave rate (e.g., 3-to-1), the present invention provides for a higher probability of recovery of the transmitted user information in high bit error rate environments since less bits per slot of user information are replaced by overhead data.

While the present invention has been particularly shown and described with reference to particular embodiments thereof, it will be understood by those skilled in the art that various changes in form and details may be made therein without departing from the spirit and scope of the present invention.

We claim:

1. A method comprising the steps of:
   providing user information and intermittent overhead data;
   selecting from a first transmission technique and a second transmission technique;
   when the first transmission technique has been selected:
      encoding a first representation of the user information using a first encoding technique;
      when the intermittent overhead data exists to be transmitted, replacing a first predetermined amount of the first representation with the intermittent overhead data to form a data unit;
   when the second transmission technique has been selected:
      encoding a second representation of the user information using a second encoding technique;
      when the intermittent overhead data exists to be transmitted, replacing a second predetermined amount of the second representation with the intermittent overhead data to form the data unit, which second predetermined amount is less per data unit than the first predetermined amount; and
   transmitting the data unit; such that when using the second transmission technique, an increased number of bits are available over time to represent the user information as compared to the first transmission technique, while a substantially equal number of bits are available over time to represent the intermittent overhead data.

2. A method comprising the steps of:
   providing voice information and, on occasion, overhead data;
   selecting from a first transmission technique and a second transmission technique;
   when the first transmission technique has been selected:
      vocoding the voice information using a first vocoding technique to provide a plurality of first representations;
      processing the plurality of first representations using an error control technique to provide first error control processed representations;
      when the overhead data is to be transmitted, replacing a first predetermined amount of at least some of the first error control processed representations with the overhead data to form a plurality of data units;
   when the second transmission technique has been selected:
      vocoding the voice information using a second vocoding technique to provide a plurality of second representations;
      processing the plurality of second representations using an error control technique to provide second error control processed representations;
      when the overhead data exists to be transmitted, replacing a second predetermined amount of at least some of the second error control processed representations with the overhead data to form the plurality of data units, which second predetermined amount is less per data unit than the first predetermined amount; and
   transmitting the plurality of data units;
      such that when using the second transmission technique, an increased number of bits are available over time to represent the voice information as compared to the first transmission technique, while a substantially equal number of bits are available over time to represent the overhead data; and such that a ratio of bits representing the overhead data to bits comprising the second error control processed representation is less on a per data unit basis than a ratio of bits representing the overhead data to bits comprising the first error control processed representations.

3. The method of claim 2, wherein the step of selecting from between a first transmission technique and a second transmission technique comprises selecting between a first radio frequency transmission technique that provides for transmission of data units at a first rate of interleaving and a second radio frequency transmission technique that provides for transmission of data units at a second rate of interleaving, which second rate of interleaving is more frequent than the first rate of interleaving.

4. The method of claim 2, wherein the step of processing the plurality of second representations using an error control technique to provide second error control processed representations includes the step of using an error control technique that is different than the error control technique that is used when processing the plurality of first representations.

5. The method of claim 2, wherein the step of replacing a first predetermined amount of at least some of the first error control processed representations with the overhead data comprises replacing at least some of the first error control processed representations with associated control procedure information.

6. The method of claim 5, wherein the step of replacing at least some of the first error control processed representations with associated control procedure information comprises the step of replacing at least some of the first error control processed representations with at least one of the group consisting of dialed digits, handoff information, and short messages.

7. The method of claim 2, wherein the step of replacing a first predetermined amount of at least some of the first error control processed representations with the overhead data comprises the step of replacing approximately one-fourth of at least some of the first error control processed representations with the overhead data.

8. The method of claim 7, wherein the step of replacing a second predetermined amount of at least some of the second error control processed representations with the overhead data comprises the step of replacing approximately one-eighth of at least some of the second error control processed representations with the overhead data.

9. The method of claim 2, wherein the step of processing the plurality of first representations using an error control technique to provide first error control processed representations comprises the step of processing the plurality of first representations using forward error correction.

10. A method of transmitting user information and intermittent overhead data in a multiplexed radio frequency communication system, the method comprising the steps of:

provuding a plurality of time slots on a radio frequency carrier;

selecting from a first transmission technique and a second transmission technique;

when the first transmission technique has been selected:
    encoding the user information using a first encoding technique to provide a plurality of first representations;
    when the intermittent overhead data exists to be transmitted, replacing a first predetermined amount of at least some of the plurality of first representations with the intermittent overhead data to form a plurality of data units;
    transmitting the plurality of data units using every Nth time slot to thereby interleave the plurality of data units with other time slots on the radio frequency carrier;

when the second transmission technique has been selected:
    encoding the user information using a second encoding technique to provide a plurality of second representations;
    when the intermittent overhead data exists to be transmitted, replacing a second predetermined amount of at least some of the plurality of second representations with the intermittent overhead data to form the plurality of data units; and
    transmitting the plurality of data units using every Mth time slot to thereby interleave the plurality of data units with other time slots on the radio frequency carrier, wherein M is less than N;

such that when using the second transmission technique, an increased number of bits are available over time to represent the user information as compared to the first transmission technique, while a substantially equal number of bits are available over time to represent the intermittent overhead data.

11. In a time division multiplexed radio communication system wherein information is conveyed via time slots of a radio frequency carrier, a method for transmitting user information and intermittent overhead data from one communication device to another communication device, the method comprising the steps of:

selecting from a first mode of transmission and a second mode of transmission;

determining whether overhead data is to be transmitted;

when transmitting in the first mode and overhead data is to be transmitted:
    transmitting the user information in a first portion of every Nth time slot;
    transmitting the overhead data in a second portion of every Nth time slot;

when transmitting in the second mode and overhead data is to be transmitted:
    transmitting the user information in a first portion of every Mth time slot; and
    transmitting the overhead data in a second portion of every Mth time slot, M being less than N and the second portion of every Mth time slot comprising less bits than the second portion of every Nth time slot;

whereby an increased number of bits are available over time to represent the user information in the second mode as compared to the first mode, while a substantially equal number of bits are available over time in both the first mode and the second mode to represent the overhead data.

12. The method of claim 11, wherein the step of determining whether overhead data is to be transmitted comprises the step of determining whether associated control procedure information is to be transmitted.

13. The method of claim 11, wherein the second portion of every Nth time slot contains one-fourth of all bits contained in both the first portion and the second portion of every Nth time slot.

14. The method of claim 13, wherein the second portion of every Mth time slot contains approximately one-eighth of all bits contained in both the first portion and the second portion of every Mth time slot.

15. The method of claim 11, wherein the first portion of every Nth time slot is larger than the second portion of every Nth time slot and wherein the first portion of every Mth time slot is larger that the second portion of every Mth time slot.

16. The method of claim 15, wherein the second portion of every Nth time slot is a sub-portion of the first portion of every Nth time slot and wherein the second portion of every Mth time slot is a sub-portion of the first portion of every Mth time slot.

* * * * *